United States Patent [19]

Hoepfl et al.

[11] 4,008,629
[45] Feb. 22, 1977

[54] SUN GEAR RETAINER IN PLANETARY GEARSET

[75] Inventors: Joseph R. Hoepfl, Greenfield; Gerardus M. Ballendux, Waukesha, both of Wis.

[73] Assignee: Allis-Chalmers Corporation, Milwaukee, Wis.

[22] Filed: Nov. 3, 1975

[21] Appl. No.: 628,523

[52] U.S. Cl. .......................... 74/781 R; 74/750 R; 74/801
[51] Int. Cl.² ..................................... F16H 57/00
[58] Field of Search ............ 74/781 R, 750 R, 785, 74/788, 801, 405, 329, 325, 333, 781 B, 750 B, 758–763, 766, 767, 784, 797

[56] References Cited

UNITED STATES PATENTS

| | | | |
|---|---|---|---|
| 2,883,885 | 4/1959 | Upton | 74/801 |
| 2,995,954 | 8/1961 | Burtnett | 74/781 R X |
| 3,165,009 | 1/1965 | Walter | 74/785 X |
| 3,273,674 | 9/1966 | Snyder | 74/785 X |
| 3,430,522 | 3/1969 | Hawkins et al. | 74/801 |
| 3,477,314 | 11/1969 | Rutkowski | 74/750 R |

Primary Examiner—James F. Coan
Attorney, Agent, or Firm—Arthur L. Nelson

[57] ABSTRACT

A stationary sun gear mounted on a sleeve fixed to the transmission housing. The sleeve provides a bearing support internally and externally of the sleeve for rotatably mounting rotating members on the sleeve. The mounting of the gear and sleeve assembly permits individual replacement of the sun gear and support sleeve as well as servicing of the bearings.

10 Claims, 4 Drawing Figures

SUN GEAR RETAINER IN PLANETARY GEARSET

This invention relates to a transmission and more particularly to the mounting of a stationary sun gear concentrically on a sleeve and the mounting of an internal bearing and an external bearing on the sleeve for mounting a rotor externally of the sleeve and a shaft internally of the sleeve. The gear and bearings are removably mounted on the sleeve to facilitate individual servicing of these components.

The sun gear in a planetary transmission must be mounted concentrically with the ring gear and any shafts designed to be rotating about a common axis of rotation. While the sun gear in conventional planetary gearsets rotates on the common axis this particular planetary gearset includes a sun gear which is stationary and mounted concentric on the axis of rotation of the output drive shaft. The sun gear is preferably constructed of steel to provide reliability while the support shaft is constructed of cast iron. To construct the gear and supporting sleeve of a steel casting or forging would be less economical and present a servicing problem. Since the shafts rotating about the common axis must have bearing supports axially spaced along the shaft, the sun gear must be mounted in such a manner to allow the bearings to be mounted for providing axial support of the shaft and provide for convenient servicing to maintain reliability of the gearset and shafts.

Accordingly, this invention provides for a removable sun gear which is mounted on a sleeve integrally supported on the transmission housing. The sun gear is fitted within the sleeve with a plurality of keys connecting the sun gear with the support sleeve to provide radial alignment of the sun gear and absorb torque when the planetary gearset is in operation. A needle bearing is positioned within the sleeve to rotatably support a drive shaft internally of the sleeve. An external bearing is also mounted on the sleeve with retainer means for holding the bearing in position and rotatably support a rotor about the external periphery of the sleeve. Both the bearings and the sun gear can be readily removed for servicing and maintenance of the planetary gearset.

It is an object of this invention to provide mounting for a gear integral with the transmission housing with bearing mounts on the internal and external periphery of a gear mount.

It is another object of this invention to provide a sleeve integral with the transmission housing for mounting internal and external bearings for rotating elements and to provide a stationary mount for a sun gear in a planetary gearset.

It is a further object of this invention to provide a mounting sleeve integral with the transmission housing for supporting a sun gear of a planetary gearset to absorb torque and radial thrust while simultaneously mounting internal and external bearings for rotating elements rotating relative to the sleeve.

It is a further object of this invention to provide a sleeve integral with the transmission housing for rotatably supporting an external bearing rotatably supporting a clutch carrier and an internal bearing rotatably supporting a drive shaft and also provide a concentric mounting of a sun gear of a planetary gearset.

The objects of this invention are accomplished by providing a transmission housing with a mounting sleeve integrally connected with the housing. External bearings are mounted externally of the mounting sleeve which rotatably support a rotor. A bearing positioned externally on a mounting sleeve of the transmission housing rotatably supports a clutch carrier while a needle bearing mounted internally of the mounting sleeve rotatably supports a drive shaft in the transmission housing. A sun gear is positioned within the end of the mounting sleeve and is provided with a plurality of keys mounted in keyways in said sun gear and mating slots in the mounting sleeve to nonrotatably mount the sun gear in said sleeve and coaxially align the concentric center of the sun gear with the rotating center of the drive shaft and provide absorption of torque between the sun gear and the mounting sleeve.

Referring to the drawings, FIG. 1 illustrates a cross-section view of the mounting for the sun gear of the planetary gearset and the internal drive shaft as well as the rotor mounted externally of the mounting sleeve;

Figure 1:
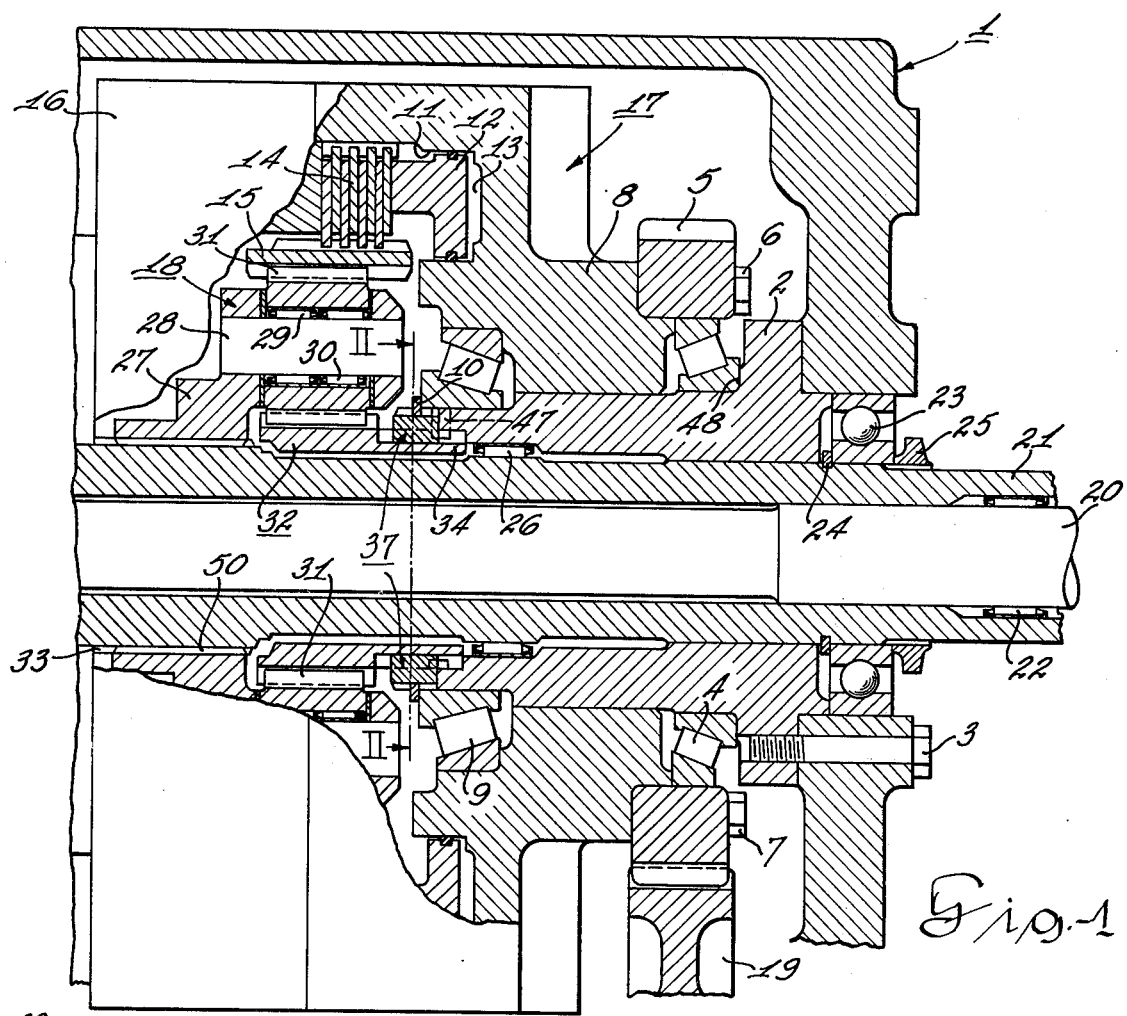
Figure 4:
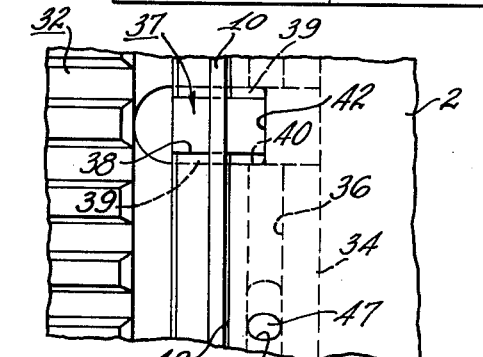
FIG. 4 is a fragmentary plan view of FIG. 3.
Figure 3:
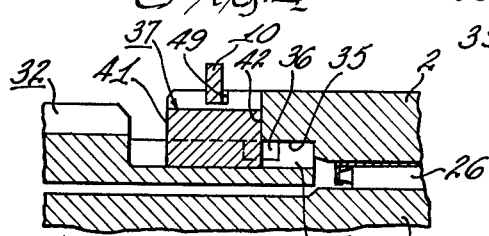
FIG. 3 is a cross-section view taken on line III—III of FIG. 2.
Figure 2:
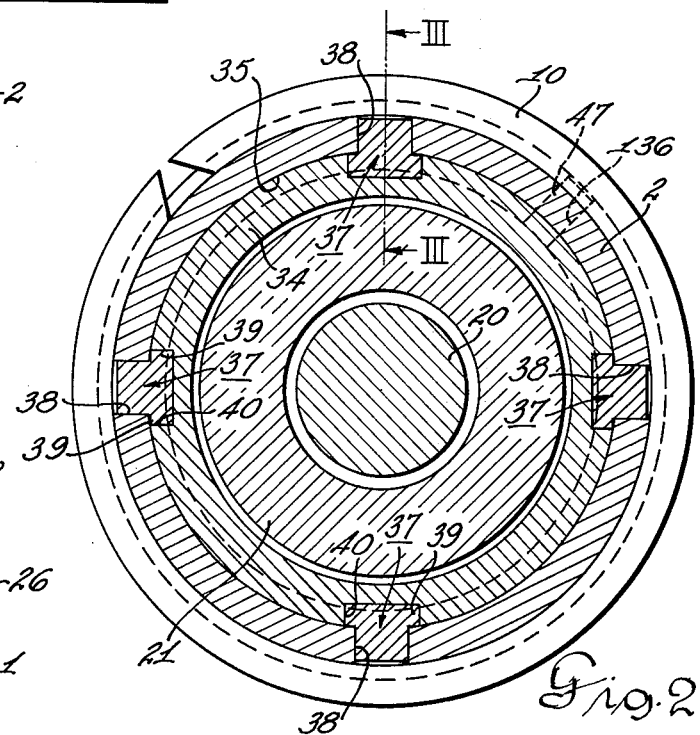
FIG. 2 is a cross-section view taken on line II—II of FIG. 1.

Referring to the drawings, FIG. 1 illustrates a cross-section view of a transmission 1 showing the mounting sleeve 2 integrally fastened by a plurality of bolts of which bolt 3 is shown. The mounting sleeve 2 supports the tapered roller bearing 4 which rotatably supports the gear 5 which is integrally fastened by a plurality of bolts 6 and 7 to the clutch carrier 8. The clutch carrier 8 is rotatably mounted on the tapered roller bearing 9 which is retained in position on the mounting sleeve 2 by the retainer ring 10. The clutch carrier 8 and the gear 5 form a rotor 17 which rotates externally on the mounting sleeve 2.

The clutch carrier 8 forms a hydraulic cylinder 11 which receives a hydraulic piston 12 and forms a pressurizing chamber 13. When pressurized fluid is received in the pressurizing chamber 13 the disc stack 14 is compressed and the clutch carrier 8 rotates with the ring gear 15.

A clutch assembly 16 is also provided on the clutch carrier 8 which operates a similar clutch which is actuated by a similar hydraulic cylinder and piston when fluid is pressurized in its pressurizing chamber. The clutch assembly 16 is adapted to transmit power to or from a gear system on the left-hand side of the transmission (not shown). The transmission of power drives through the rotor 17 for transmitting power to the ring gear 15 when desired. When the clutch 14 is engaged power is transmitted through the ring gear 15 to the planetary gearset 18.

Similarly, a countershaft gearset is provided for driving through the countershaft gear 19. The countershaft gear 19 drives the gear 5 which is a part of the rotor 17 which in turn can be connected to the ring gear through the clutch 14.

The drive shaft 20 drives from the left-hand side of the transmission and extends through the quill shaft 21 which is an output shaft from the transmission. The driveshaft 20 is rotatably supported in the needle bearing assembly 22 and similarly rotatably supported in the left-hand portion of the transmission (not shown). The quill shaft 21 is rotatably supported on the ball bearing assembly 23 which is embraced by the transmission housing 1. The ball bearing assembly 23 seats against the snap ring 24 and is held in position by the retainer nut 25.

The quill shaft 21 is rotatably supported on the left-hand side by the needle bearing assembly 26. The needle bearing assembly 26 is mounted within the mounting sleeve 2.

The planetary gearset 18 includes a planetary carrier 27 which carries the planetary pins 28 forming support for the needle bearing assemblies 29 and 30. The needle bearing assemblies 29 and 30 rotatably support the planetary gears 31 of which one is shown. The planetary gear 31 engages a ring gear 15 as well as the sun gear 32. The planetary carrier 27 is formed with a spline 50 which engages a mating spline 33 all in the quill shaft 21.

The sun gear 32 is formed with a mounting flange 34 which is forced within the cylindrical opening 35 to form a force fit with the mounting sleeve 2. The mounting flange 34 is formed with an annular groove 36 which receives a pin 47 extending from hole 136 in the mounting sleeve to hold the sun gear within the mounting sleeve and prevent the sun gear from moving axially and becoming disconnected from the mounting sleeve 2.

A plurality of keys 37 are mounted in key slots 38 of the mounting sleeve 2. Each of the keys 37 has shoulders 39 received within key way 40 in the support flange 34. The shoulders 39 limit the radial movement of the keys to within the confinement of the mounting sleeve 2. The torque of the sun gear is transmitted through the keys 37 to the mounting sleeve 2. The keys 37 are prevented from moving axially by the formation of the key slot which limits the axial movement in the left-hand direction. The head 41 of the key 37 engages a surface 42 in the key slot 38 of the mounting sleeve 2 to prevent movement in the right-hand direction. Accordingly, the sun gear is firmly seated and concentrically aligned within the mounting sleeve 2.

The mounting and the functioning of the bearings and the sun gear in the mounting sleeve will be described in the following paragraphs.

The mounting sleeve 2 is integrally mounted with the transmission 1 by means of a plurality of bolts 3 of which one is shown. The sleeve 2 supports tapered roller bearings assemblies 4 and 9 and the roller bearing assemblies are firmly seated in their position by the tolerances between the radial flange 48 of the mounting sleeve and the retainer ring 10 on opposing sides of the clutch carrier 8. The axial dimensions of the clutch carrier 8 between the tapered roller bearings 4 and 9 is such that the tapered roller bearings are in proper running adjustment when the snap ring is seated in the slot 49 for the retainer ring. The clutch carrier 8 and the rotor 17 are rotatably mounted on the mounting sleeve 2 for concentric rotation with the drive shaft 20.

The needle bearing 26 is positioned within the sleeve 2 to rotatably support the quill shaft 21 while the roller bearing assembly 23 rotatably supports the right-hand end of the quill shaft 21 to thereby provide concentric rotation of the quill shaft 21 about the axis of rotation of the drive shaft 20.

A planetary carrier 27 is connected by the spline 50 and 33 to the quill shaft 21. The sun gear 32 is firmly seated within the mounting sleeve 2 and held in this position by the pin 47. A plurality of keys 37 positioned within the key slots 38 of mounting sleeve and the key ways 40 of sun gear 34 to lock the mounting sleeve 2 and the sun gear 32. The shoulders 39 of the keys 37 limit the radial outward movement of the keys to within the internal diametral confinement of the sleeve 2.

The sun gear can be readily removed by removing the retainer ring 10 and then removing the tapered roller bearing 9 to permit access to the pin 47 which can then be removed. When pin 47 is removed the sun gear can be removed from the mounting sleeve 2. In this manner the bearings, including the needle bearing 26, can be serviced and the sun gear 32 can be readily remounted on the mounting sleeve 2 as well as the bearings including tapered roller bearing 9.

Accordingly, the mounting of the bearing and the sun gear are accurately aligned by controlling the dimensions of the sleeve, the gear and other components.

The embodiments of the invention in which an exclusive property or privilege is claimed are defined as follows:

1. A gear and bearing mounting in a transmission comprising, a transmission housing, a mounting sleeve connected to said housing defining a plurality of key slots, a bearing mounted externally on said sleeve, means for retaining said bearing on said sleeve, a second bearing mounted internally in said sleeve, a gear having a supporting flange defining a plurality of keyways and mounted in said sleeve, a plurality of keys mounted in said key slots of said sleeve and said keyways of said supporting flange for absorbing torque transmitted between said sleeve and said gear, fastening means holding said gear axially on said mounting sleeve, shoulders on said keys engaging said mounting sleeve for retaining said keys in said keyways and key slots.

2. A gear and bearing mounting in a transmission as set forth in claim 1 wherein said fastening means includes means defining an annular recess in said supporting flange of said gear, means defining a radial hole in said mounting sleeve, a pin received in said radial hole and said annular recess to thereby lock said gear on said mounting sleeve.

3. A gear and bearing mounting in a transmission as set forth in claim 1 wherein said means for retaining said bearing on said sleeve includes means defining an annular groove on said mounting sleeve, a snap ring received in said annular groove for retaining said bearing on said sleeve.

4. A gear and bearing mounting in a transmission as set forth in claim 1 wherein said bearing mounted on the external periphery of said sleeve defines a bearing assembly for rotatably mounting a rotor, said second bearing mounted internally of said sleeve defines a needle bearing for rotatably mounting a shaft within said sleeve.

5. A gear and bearing mounting in a transmission as set forth in claim 1 wherein said bearing mounted on the external periphery of said sleeve defines a tapered roller bearing, a rotor rotatably mounted on said bearings, said retainer means includes a snap ring fastening said bearings in normal operating position on said sleeve, said second bearing rotatably mounted within said sleeve defining a needle bearing for rotatably supporting said shaft to thereby provide rotatable support of said shaft on the concentric axis with said rotor.

6. A gear and bearing mounting in a transmission as set forth in claim 1 wherein said flange defines at least four keyways, said mounting sleeve defines at least four key slots, four keys mounted in said key slots and keyways for concentrically supporting said gear on said mounting sleeve.

7. A gear and bearing mounting in a transmission as set forth in claim 1 wherein said supporting flange of said gear defines an annular groove, said mounting sleeve defines a radial opening, a pin received in said radial opening and said annular groove for locking said gear on said sleeve, said bearing mounted externally of said sleeve holding said pin in the fastening position for holding said gear on said sleeve.

8. A gear and bearing mounting in a transmission as set forth in claim 1 wherein each of said keys define a shoulder portion positioned between the external periphery of said mounting flange and the internal periphery of said mounting sleeve for concentrically aligning said gear with said sleeve.

9. A gear and bearing mounting in a transmission as set forth in claim 1 wherein said key defines a shoulder portion positioned intermediate the supporting flange of said gear and said mounting sleeve to absorb radial thrust between said gear and said sleeve and said keys absorb torque transmitted between said gear and said sleeve.

10. A gear and bearing mounting in a transmission as set forth in claim 1 including means defining an annular recess and a radial surface on the external end at said mounting sleeve for receiving said supporting flange and engaging the inner end of said supporting flange in the assembled position.

* * * * *